United States Patent [19]

Sunne

[11] Patent Number: 5,122,067
[45] Date of Patent: Jun. 16, 1992

[54] UMBILICAL RELEASE MECHANISM

[75] Inventor: Wayne L. Sunne, Tucson, Ariz.

[73] Assignee: Hughes Aircraft Company, Los Angeles, Calif.

[21] Appl. No.: 704,460

[22] Filed: May 23, 1991

[51] Int. Cl.⁵ .................................... H01R 13/00
[52] U.S. Cl. ...................... 439/91; 439/160; 439/258
[58] Field of Search ............. 439/152, 153, 155, 158, 439/258

[56] References Cited

U.S. PATENT DOCUMENTS

| | | | |
|---|---|---|---|
| 3,063,032 | 11/1962 | Brush | 439/258 |
| 3,112,672 | 12/1963 | Webb | 439/158 |
| 4,209,481 | 6/1980 | Kashiro et al. | 439/91 |

Primary Examiner—Joseph H. McGlynn
Attorney, Agent, or Firm—R. M. Heald; C. D. Brown; W. K. Denson-Low

[57] ABSTRACT

An umbilical release mechanism (10) for disconnecting an electrical umbilical (14, 16) extending between a host and a releasable vehicle accomplishes the disconnection without imparting any force to the releasable vehicle, and without leaving pieces of the disconnection mechanism (10) in the releasable vehicle. The umbilical release mechanism (10) includes an umbilical connector (12) in which two electrical harness connectors (22, 24) are releasably clamped together, with an intermediate plate (28) using a mat (32) of electrically conductive wires to complete the electrical conduction path between the harness connectors (22, 24). A pair of backing plates (34, 36) having a clamping bore (38) therethrough capture the harness connectors (22, 24) therebetween. A clamping force is releasably applied to the backing plates (34, 36) by engaging a hollow outer shaft (40) through the clamping bore (38), and reacting a clamping force on the backing plates (34, 36) through the outer shaft (40). A ball lock on the vehicle-side end of the outer shaft (40) is released by withdrawing an inner shaft (48) that extends through the hollow outer shaft (40). An interlock on the inner shaft (48) engages and withdraws the outer shaft (40) after the inner shaft (48) has been moved a predetermined distance, effecting the separation.

17 Claims, 3 Drawing Sheets

UMBILICAL RELEASE MECHANISM

BACKGROUND OF THE INVENTION

This invention relates to a mechanism for disconnecting electrical and/or fluid lines running between a host vehicle and a releasable vehicle.

Many types of spacecraft and missile systems utilize an umbilical extending between a host and a releasable vehicle. In a common example, a host carries the smaller vehicle until the vehicle is to be released and sent on its way to accomplish some particular mission. Before the host and the vehicle are mechanically separated, there is typically an electrical umbilical extending between the two, permitting electrical communication of information in both directions, and operational commands to be communicated from the host to the vehicle. There may also be a fluid (gas or liquid) umbilical that provides pressurization gas, cryogenic coolant, fuel, or other consumable material to the releasable vehicle from the host. When the releasable vehicle is mechanically separated from the host, the umbilicals must be disconnected.

Several types of mechanisms are now in use to accomplish umbilical disconnection. One common approach for disconnecting electrical umbilicals is to place a guillotine blade in a position to sever the umbilical. The blade is activated by a small explosive charge (termed a squib charge) that drives the blade through the electrical umbilical, severing it. Another approach is to provide a mechanical connector in the umbilical, and to use explosive bolts to separate the connector.

While existing umbilical release mechanisms work reliably and well in many applications, they suffer from drawbacks in others. The firing of even a small explosive charge near the vehicle to effect separation of the umbilical imparts a force to the vehicle from the expanding gases of the explosion, or may transmit a force to the vehicle by a jerk on the separating end of the umbilical. The applied force causes the vehicle's trajectory to change to a small degree. In some cases the small force exerted by the umbilical separation may be insignificant. However, if the host is, for example, a spacecraft operating in space or other vehicle, and the releasable vehicle is unpowered, has a small mass, or is powered with limited fuel, the force on the vehicle applied as a result of the umbilical separation, and the resulting trajectory change, may be unacceptable.

Existing umbilical disconnect approaches may also not meet other system requirements, such as weight or reliability limitations, or may be too costly. Also, it has been common practice to custom design each umbilical disconnect for a particular application. Since absolute reliability of operation is necessary, each custom disconnect must be extensively tested and qualified for its application. More versatility of the disconnect design is highly desirable, so that fewer designs must be qualified for operation.

There is therefore a need for an improved approach for reliably achieving umbilical release, which applies no force to the separating vehicle. The present invention fulfills this need, and further provides related advantages.

SUMMARY OF THE INVENTION

The present invention provides an umbilical release mechanism that achieves electrical and physical disconnection of the umbilical while applying substantially no separating force to the vehicle. A "soft" separation is thereby achieved, which has no adverse impact on the trajectory of the released vehicle. The release mechanism is contained within the host and retained in the host after disconnection, so that there is no extra mass carried by the vehicle or volume required in the vehicle for a portion of the mechanism. The only additional mass and volume in the spacecraft is that due to the small connector required for the umbilical, about 15 grams in a working embodiment. The release mechanism in the host is small and of low mass, and has a reliable design and components.

In accordance with the invention, an umbilical release mechanism for disconnecting an umbilical extending between a host and a releasable vehicle accomplishes the disconnection without imparting any force to the releasable vehicle, and without leaving pieces of the disconnection mechanism in the releasable vehicle. The umbilical release mechanism includes an umbilical connector in which two electrical harness connectors are releasably clamped together, preferably with an intermediate plate having bores corresponding to the electrical contacts of the harness connectors filled with crumpled masses of electrical wires to complete the electrical conduction path between the harness connectors. A pair of backing plates having a clamping bore therethrough capture the harness connectors therebetween.

A clamping force is releasably applied to the backing plates by engaging a hollow outer shaft through the clamping bore, and reacting a clamping force on the backing plates through the outer shaft. A ball lock on the vehicle-side end of the outer shaft is released by withdrawing an inner shaft that extends through the hollow outer shaft. An interlock on the inner shaft engages and withdraws the outer shaft after the inner shaft has been moved a predetermined distance, effecting the separation. The inner shaft is preferably withdrawn by exerting a gas pressure against a piston on the remote end of the shaft.

The present approach achieves the electrical and mechanical disconnection of the electrical umbilical without an event that would impart a force to the vehicle. The gas pressure that drives the separation is preferably supplied from a gas source on the host, or using a self-contained gas generating cartridge. The release mechanism stays with the host, leaving onto the weight of half of the connector in the released vehicle. Other features and advantages will be apparent from the following more detailed description of the preferred embodiment, taken in conjunction with the accompanying drawings which illustrate, by way of example, the principles of the invention.

DETAILED DESCRIPTION OF THE INVENTION

Figure 1:
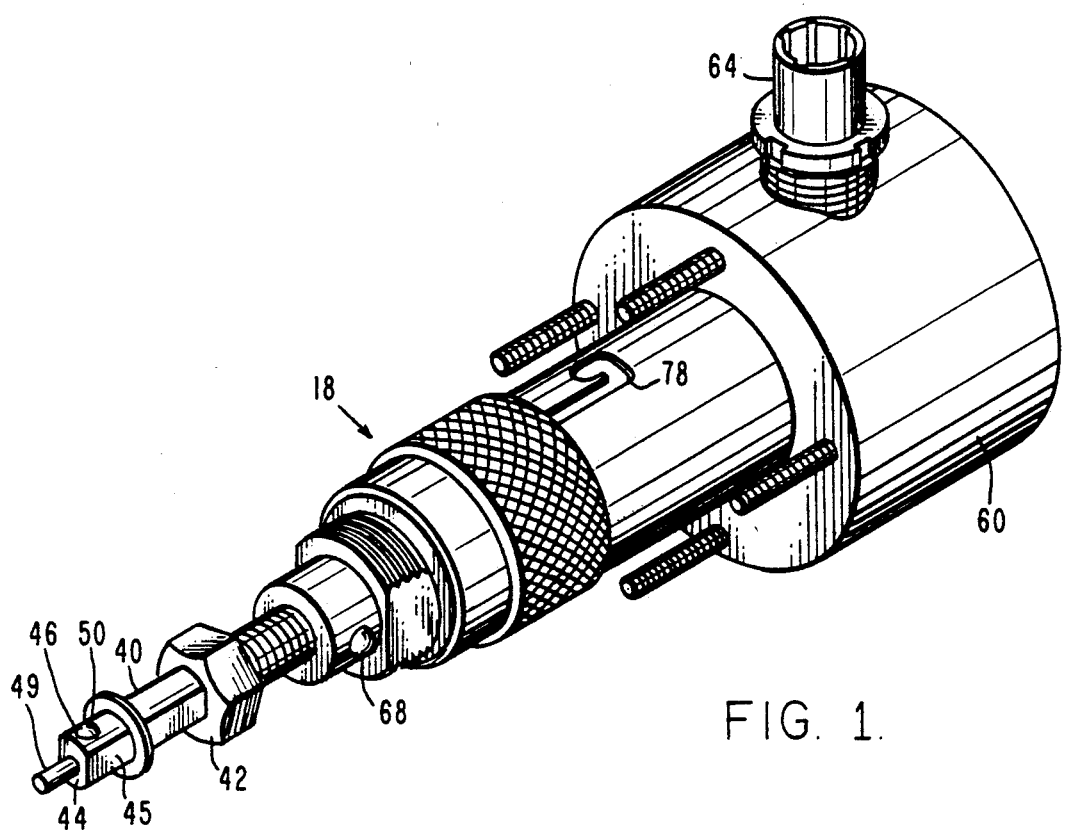
FIG. 1 is a perspective veiw of a clamping and release mechanism.
Figure 2:
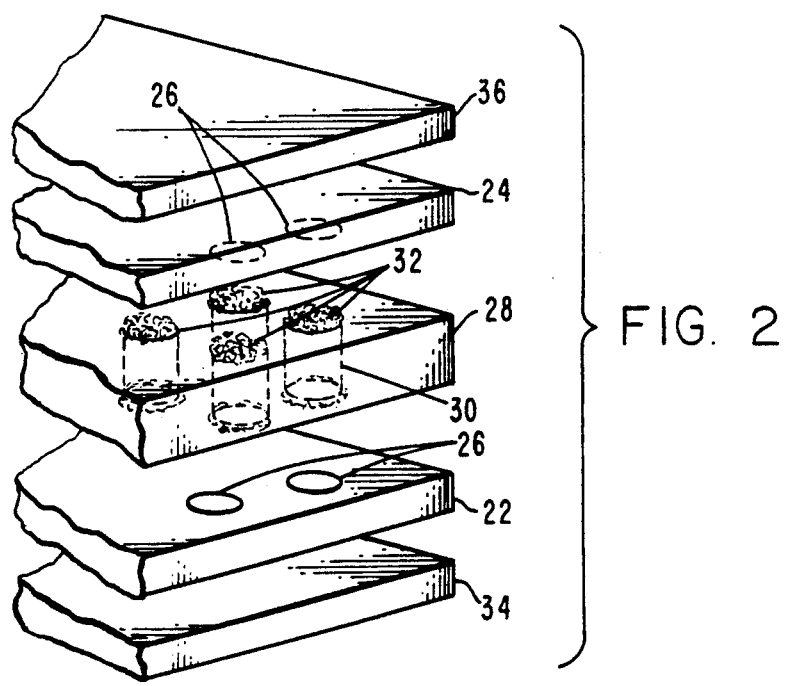
FIG. 2 is an enlarged perspective exploded view of the harness connectors and intermediate plate.
Figure 3:
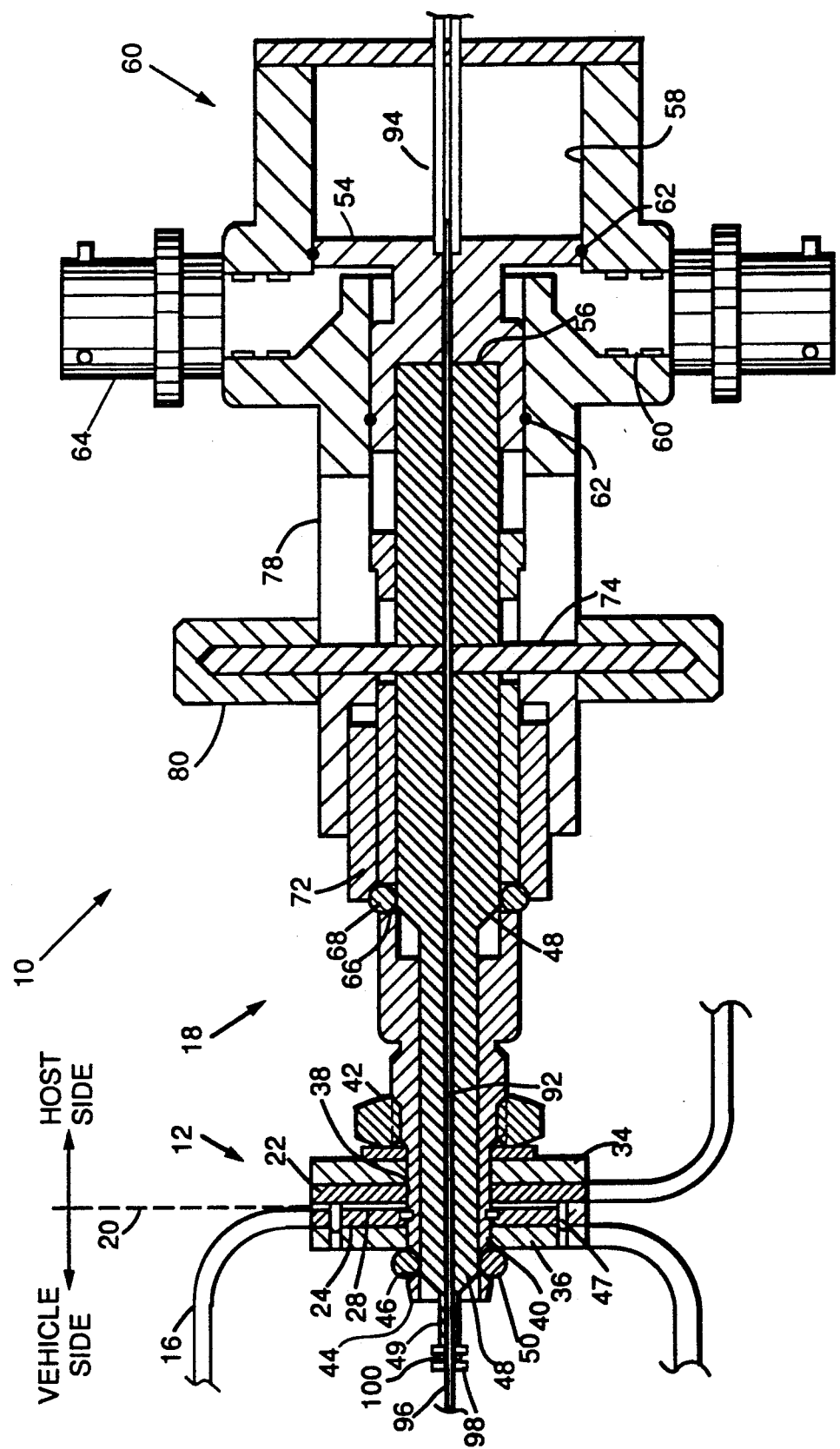
FIG. 3 is a side sectional view of the preferred umbilical release mechanism in connected form.
Figure 4:
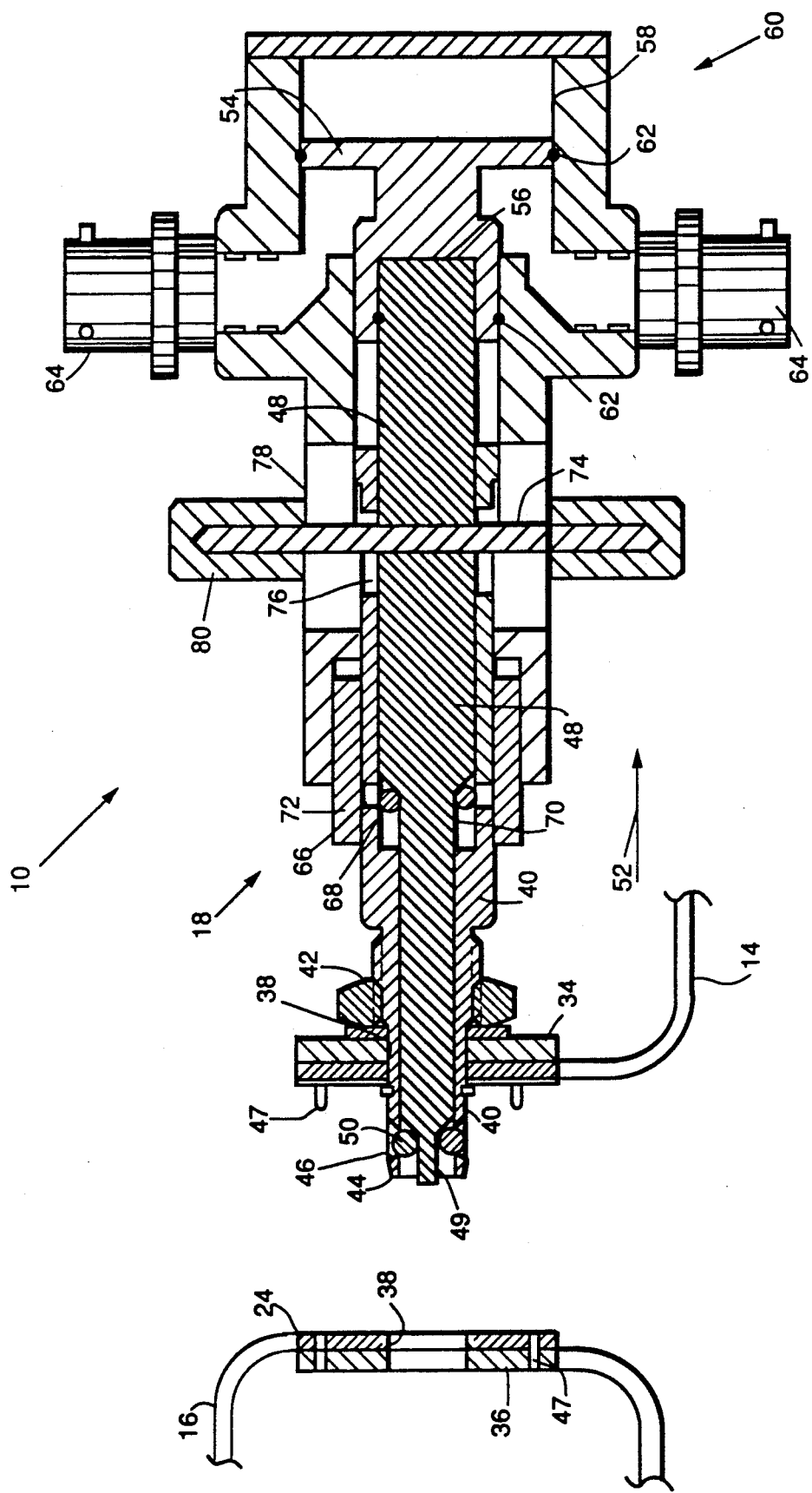
FIG. 4 is a side sectional view of another embodiment of the umbilical release mechanism in separated form.

FIGS. 1-4 depict a preferred form of an umbilical release mechanism 10 of the invention. FIG. 3 shows the mechanism prior to disconnection and separation, and FIG. 4 shows the mechanism after disconnection. FIGS. 3 and 4 also differ in that FIG. 3 depicts an embodiment having both electrical and fluid umbilical disconnect capability, while FIG. 4 depicts an embodiment having only electrical umbilical disconnect capability.

The mechanism 10 may conveniently be discussed as two parts. The first part is an umbilical connector 12 that performs the electrical connection between a host-side portion of an umbilical 14 and a vehicle-side portion of an umbilical 16. The second part is a clamping and release mechanism 18 that holds the two portions of the umbilical connector together until receipt of a commmand to release them to permit separation.

In FIG. 3, a dividing line 20 marks the demarcation between the portion of the mechanism 10 that is within the host (to the right of the dividing line), and the portion of the mechanism 10 that is within the releasable vehicle (to the left of the dividing line). A portion of the umbilical connector 12 is within the host and a portion within the vehicle, and these parts remain with the host and vehicle after disconnection. Most of the clamping and release mechanism 18 is in the host, and a small portion protrudes into the vehicle before disconnection. During disconnection, however, all of the clamping and release mechanism 18 is withdrawn into the host.

As best seen in FIGS. 2 and 3, the umbilical connector 12 includes a host-side electrical harness connector 22 and a vehicle-side electrical harness connector 24. The connectors 22 and 24 each have a set of electrical contacts 26, preferably in the form of pads. An intermediate plate 28 made of an electrically nonconducting material, such as a plastic of the polyester or polyethylene sulfide type, is placed between the connectors 22 and 24. The intermediate plate 28 has a set of bores 30 therethrough. The set of bores 30 corresponds in number and location of the bores to the sets of electrical contacts 26. The intermediate plate 28 and the connectors 22 and 24 are positioned so that the two sets of contacts 26 are in a facing relationship to each other, and in a line of sight with each other through the set of bores 30.

The bores of the set of bores 30 are each preferably filled with a mass of fine metallic wires compressed together to form a mat of wires 32. In a working embodiment constructed to test the present invention, the contacts are gold, and the wires in the mat 32 are gold-plated wires having a composition of 97 percent copper and 3 percent silver, to resist corrosion. The wires are typically about 0.002 inches in diameter. Such a mat of wires is sometimes known as a "fuzz button", and is similar in appearance to a small piece of steel wool. Operable wire mats are available commerically from Cinch Co. The mat of wires 32 provides an electrical connection between the contacts of the umbilical connectors 22 and 24, which will not weld together under pressure.

The mat 32 fills the bores 30, and extends beyond the ends of the bores 30. In the working embodiment, the bores had a diameter of 0.038 inches and a length of 0.032 inches, and were spaced on 0.100 centers. The wire mats 32 protruded from each end of the bores about 0.008-0.015 inches, prior to assembly of the umbilical connector 12.

A pair of backing plates, a host-side backing plate 34 and a vehicle-side backing plate 36, are placed on either side of the connectors 22 and 24. When a clamping pressure is applied to the backing plates 22 and 24, they hold the connectors 22 and 24 together until the clamping pressure is removed.

The clamping and release mechanism 18 clamps the backing plates 34 and 36 together with a preselected clamping pressure, until commanded to release the clamping pressure. In the working embodiment of the invention, the clamping pressure was about one pound total for the connector. The clamping pressure is applied by providing a clamping bore 38 through the backing plates 34 and 36, the connectors 22 and 24, and the intermediate plate 28. The clamping bore 38 is laterally displaced from the region where the sets of contacts 26 are located to avoid any interference.

A hollow outer shaft 40 is slidably disposed through the clamping bore 38. The portion of the outer shaft 40 adjacent the host-side backing plate 34 is externally threaded, and a pre-load nut 42 is threaded onto the outer shaft 40. Tightening of the nut 42 applies a clamping force to the host-side backing plate 34 that is reacted through the outer shaft 40 against the vehicle-side backing plate 36, in a manner to be described. At an end 44 of the outer shaft 40 adjacent the vehicle-side backing plate 36 are a number of ball-lock openings 46 spaced around the circumference of the outer shaft 40. In the preferred embodiment, there are two ball-lock openings 46 spaced 180 degrees apart on the circumference of the outer shaft 40, with flats 45 machined on the shaft 40 at the 90 degree positions to react the torgue produced by tightening of the nut 42 against the backing plates 34 and 36. Additionally, small pins 47 extend through the backing plate 36 and connector 24 to align these components and react and torsional forces that may be applied. Another set of similar pins extend through the backing plate 34 and connector 22 to perform the same function, but are out of the plane of the drawing of FIGS. 3 and 4.

An inner shaft 48 is slidably disposed within the outer shaft 40. The inner shaft 48 has a generally constant diameter over the region that extends through the clamping bore 38, tapering to a small diameter 49 at the end which extends past the region of the ball-lock openings 46 of the outer shaft 40. A number of ball-lock balls 50 each having a diameter greater than the wall thickness of the outer shaft 40 are rollably disposed within the ball lock openings 46 of the outer shaft 40, and ride upon the surface of the inner shaft 48. When the pre-load nut 42 is tightened, the ball-lock balls 50 are drawn against the back side of the vehicle-side backing plate 36, thus providing the reaction for the clamping force and serving to center the shafts 40 and 48 within the clamping bore 38 to minimize friction when the shafts 40 and 48 are later withdrawn.

To release the clamping force, the inner shaft 48 is withdrawn in a withdrawal direction 52 toward the host, and away from the connectors 22 and 24. The ball-lock balls 50 fall inwardly because of the reduced diameter 49 of the inner shaft, and the clamping force can no longer be reacted through the backing plates 34 and 36. The end of the outer shaft 40 is tapered inwardly so that the ball-lock balls 50 are retained within the outer shaft 40 and do not fall into the interior of the releasable vehicle. By a slot interlock to be described subsequently, the withdrawal of the inner shaft 48 proceeds a distance and then engages the outer shaft 40 to cause it to withdraw. When both shafts 40 and 48 are withdrawn into the host, the connectors 22 and 24 are free to separate to complete the mechanical, electrical, and fluid umbilical disconnection.

In the preferred approach, withdrawal of the inner shaft 48 is achieved through the application of gas pressure to a pistion 54 at a distal end 56 of the inner shaft 48. The piston 54 rides within a cylinder 58 that is part of a retaining mechanism body 60. O-ring seals 62 seal the cylinder chamber within which the piston 54 rides. A gas generator 64 is attached to the side of the retaining mechanism body 60, through a passageway that permits application of a gas pressure when the gas generator 64 is activated. Small, remotely activated gas generators are commerically available, and a preferred gas generator is the model PC23 available from Hi-Shear Technology Corp. Equivalently, a compressed gas source aboard the host can be used, or a bottled gas source, to provide the gas to move the piston 54 and inner shaft 48 upon command.

A keying mechanism permits the inner shaft 48 to slide away from the connectors 22 and 24 a short distance to unlock the ball-lock mechanism 46, 50 without moving the outer shaft 40. After the inner shaft 48 has slid a distance preselected according to the geometry of the keying mechanism, the outer shaft 40 is engaged and slides in the same direction to complete the disengagement.

The keying mechanism includes a second ball-lock. A second set of ball-lock openings 66 is placed adjacent an adjustable bushing 72 that fits into the retaining mechanism body 60. A set of ball-lock balls 68 rides within the ball-lock openings 66 and rolls on the surface of the inner shaft 48. A reduced diameter 70 of the inner shaft is provided slightly further from the bushing 72. As the inner shaft 48 is moved in the withdrawal direction 52, the outer shaft is held stationary by the interlocking between the ball-lock balls 68, the ball-lock openings 66, and the bushing 72. After the predetermined length of movement, the ball-lock balls 68 fall inwardly when the reduced diameter 70 is encountered, and the outer shaft 40 is unlocked so that it may move.

A connecting pin 74 extends through the inner shaft 48, a slot 76 in the outer shaft 40 extending parallel to the withdrawal direction 52, and a slot 78 in the retaining mechanism body 60 also extending parallel to the withdrawal direction 52. After the movement of the inner shaft 48 has released the second ball lock mechanism so that the outer shaft 40 may slide within the retaining mechanism body 60, the connecting pin 74 slides along the slot 76 for a distance predetermined by the length of the slot 76. When the connecting pin 74 encounters the end of the slot 76, the continued withdrawal of the inner shaft 48 causes the withdrawal of the outer shaft 40. The length of the cylinder 58 is selected to be sufficient that both the inner shaft 48 and the outer shaft 40 are withdrawn completely free of the connectors 22 and 24 before the piston 54 reaches the end of the cylinder 58. A handle 80 is desirably placed on the end of the connecting pin 74 to permit the umbilical release mechanism 10 to be operated manually during assembly and adjustment, ensuring that it will operate smoothly and reliably when operated remotely using the gas generator 64.

In operation, the mechanism 10 is assembled, and the pre-load nut 42 tightened to compress the connectors 22 and 24 together. The second ball lock 66, 68, 70 is preloaded by tightening the bushing 72. The electrical contacts may be tested to ensure continuity by sending signals through the umbilicals 14 and 15. The handle 80 may be operated as needed to ensure that the mechanism 10 is operating smoothly, and to assess the effect of any adjustements.

After the host and vehicle are launched, and release is to be accomplished, the gas generator 64 is remotely fired to force the piston 54 and thence the inner shaft 48 to move in the withdrawal direction 52. The movement of the inner shaft 48 (with the outer shaft 40 held stationary by the second ball-lock mechanism 66, 68, 70, 72) releases the first ball-lock mechanism 46, 50, thereby releasing the clamping force between the backing plates 34 and 36. The continued movement of the inner shaft 48 causes the connecting pin 74 to engage the outer shaft 40, thereby withdrawing the outer shaft 40 along with the inner shaft 48. The vehicle is free to drift away from the host, with substantially no applied force from the separation operation. The release of the force applied to the mat 32 may provide a very small separation force. Alternatively, a precisely controlled separation force could be applied by capturing a spring between the backing plates 34 and 36, which expands upon release of the clamping force.

The presently preferred apparatus has been constructed and tested in an earth environment. No movement resulting from the disconnect procedure could be discerned.

The approach of the invention may also be used to accomplish fluid disconnects, such as for gas or liquid lines extending between the host and the releasable vehicle. FIG. 3 shows a preferred form of a combination electrical and fluid umbilical release mechanism 10 (while FIG. 4 shows only the electrical release mechanism). In this form of the invention, the inner shaft 48 is hollow to form a fluid passage 92. At its host-side end, the fluid passage 92 connects through the piston 54 to a host-side fluid line 94. At its vehicle-side end, the fluid passage connects to a vehicle-side fluid line 96 by a butt-end connector 98 provided with an O-ring seal 100. In other respects, the mechanism of FIG. 3 has a structure and operation like that of the mechanism of FIG. 4. When the mechanism of FIG. 3 is operated in the manner previously described, the two sides of the butt-end connector 98 and the O-ring seal 100 are parted. In the form shown in FIG. 3, both electrical and fluid umbilicals are disconnected at the same time. A comparable approach can be provided if only a fluid umbilical is to be disconnected, and no electrical release mechanism is required.

Although particular embodiments of the invention have been described in detail for purposes of illustration, various modifications may be made without departing from the sprit and scope of the invention. Accordingly, the invention is not to be limited except as by the appended claims.

What is claimed is:

1. An umbilical release mechanism for disconnecting an electrical umbilical extending between a host and a releasable vehicle, comprising:
   a vehicle-side umbilical connector, the vehicle-side umbilical connector including
      a vehicle-side electrical harness connector having a set of electrical contacts thereon, and
      a vehicle-side backing plate behind the vehicle-side electrical harness connector;

a host-side umbilical connector, the host-side electrical harness connector having a set of electrical contacts thereon, the set of electrical contacts of the host-side electrical harness connector being in facing relationship and in registry with the set of electrical contacts of the vehicle-side electrical harness connector, and a host-side backing plate behind the host-side electrical harness connector;

an intermediate plate between the vehicle-side umbilical connector and the host-side umbilical connector, the intermediate plate comprising an electrically nonconducting support plate having a set of bores therethrough in registry with the set of electrical contacts of the vehicle-side electrical harness connector and the set of electrical contacts of the host-side electrical harness connector, each of the set of bores being filled with a mass of electrically conducting wires; and means for applying a clamping pressure between the vehicle-side backing plate and the host-side backing plate and for releasing the clamping pressure responsive to a remote signal while imparting substantially no release-associated force to the vehicle-side umbilical connector.

2. The umbilical release mechanism of claim 1, wherein the means for applying and for releasing comprises a clamping bore extending through the vehicle-side backing plate, the vehicle-side electrical harness connector, the intermediate plate, the host-side electrical harness connector, and the host-side backing plate;

a hollow outer shaft extending through the clamping bore, the outer shaft being threaded behind the host-side backing plate;

an inner shaft extending through the center of the hollow outer shaft;

a set of ball-lock openings in the outer shaft behind the vehicle-side backing plate;

a set of ball-lock balls resting in the ball-lock openings, an outer portion of the ball-lock balls protruding above the outer shaft to contact the vehicle-side backing plate and an inner portion of the ball-lock balls riding on the inner shaft;

a preloading nut threadably engaged to the threads of the outer shaft behind the host-side backing plate; and means for withdrawing the portion of the inner shaft upon which the ball-lock balls rest, and thereafter withdrawing the outer shaft from the clamping bore, the means for withdrawing being located on the host side of the umbilical.

3. The umbilical release mechanism of claim 2, wherein the means for releasably withdrawing comprises a retaining mechanism body having the outer shaft slidably disposed therein, with the inner shaft slidably disposed within the outer shaft;

an elongated body slot in the retaining mechanism body;

an elongated shaft slot in the outer shaft, the shaft slot being in registry with the body slot but being shorter in length than the body slot;

a pin fixed in the inner shaft and extending outwardly through the shaft slot and the body slot; and means for moving the inner shaft in a direction away from the umbilical connectors.

4. The umbilical release mechanism of claim 3, wherein the means for moving the inner shaft comprises a piston on the end of the inner shaft remote from the umbilical connectors; and a gas generator that applies a gas pressure to the piston so as to move the inner shaft in the direction away from the umbilical connector.

5. The umbilical release mechanism of claim 3, further including a set of second ball-lock openings in the outer shaft adjacent a shoulder on the retaining mechanism body;

a set of second ball-lock balls resting in the second ball-lock openings, an outer portion of the second ball-lock balls protruding above the outer shaft to contact the shoulder on the retaining mechanism body and an inner portion of the second ball-lock balls riding on the inner shaft;

a depression in the inner shaft disposed such that movement of the inner shaft in the direction away from the umbilical connector causes the second set of ball-lock balls to fall therein, releasing the contact against the shoulder on the retaining mechanism body.

6. An umbilical release mechanism for disconnecting an electrical umbilical extending between a host and a releasable vehicle, comprising:

an umbilical connector, including a host-side electrical harness connector and a vehicle-side electrical harness connector, each having a set of electrical surface contact pads thereon arranged in a facing relationship to each other, and a pair of backing plates having the two electrical harness connectors captured therebetween, one of the backing plates on the vehicle and one of the backing plates on the host;

means for applying a clamping pressure between the vehicle-side backing plate and the host-side backing plate and for releasing the clamping pressure responsive to a remote signal while imparting substantially no release-associated force to the vehicle-side electrical harness connector, the means for applying and for releasing remaining entirely with the host after disconnection of the host and the vehicle.

7. The umbilical release mechanism of claim 6, further including an intermediate plate between the vehicle-side electrical harness connector and the host-side electrical harness connector, the intermediate plate comprising an electrically nonconducting support plate having a set of bores therethrough in registry with the set of electrical contacts of the vehicle-side electrical harness connector and the set of electrical contacts of the host-side electrical harness connector, each of the set of bores being filled with a mass of electrically conducting wires.

8. The umbilical release mechanism of claim 6, wherein the means for applying and releasing comprises a clamping bore extending through the two backing plates, a hollow outer shaft extending through the clamping bore, means for releasably locking the outer shaft against the vehicle-side support plate, means for exerting a clamping force against the host-side support plate through the outer shaft, the means for releasably locking the outer shaft and the means for exerting a clamping force cooperating to compress the umbilical harness connectors between the two support plates, and means for releasing the means for releasably locking the outer shaft, the means for releasing being activated through the hollow outer shaft.

9. The umbilical release mechanism of claim 8, wherein the outer shaft is threaded in the region adjacent the host-side backing plate, and the means for exerting a clamping force comprises a preloading nut threadably engaged to the threads of the outer shaft behind the host-side backing plate.

10. The umbilical release mechanism of claim 8, wherein the means for releasing comprises
an inner shaft extending through the center of the hollow outer shaft;
a set of ball-lock openings in the outer shaft behind the vehicle-side backing plate;
a set of ball-lock balls resting in the ball-lock openings, an outer portion of the ball-lock balls protruding above the outer shaft to contact the vehicle-side backing plate and an inner portion of the ball-lock balls riding on the inner shaft; and
means for withdrawing the portion of the inner shaft upon which the ball-lock balls rest, and thereafter withdrawing the outer shaft from the clamping bore, the means for withdrawing being located on the host side of the umbilical.

11. The umbilical release mechanism of claim 10, wherein the means for withdrawing comprises
a retaining mechanism body having the outer shaft slidably disposed therein, with the inner shaft slidably disposed within the outer shaft;
an elongated body slot in the retaining mechanism body;
an elongated shaft slot in the outer shaft, the shaft slot being in registry with the body slot but being shorter in length than the body slot;
a pin fixed in the inner shaft and extending outwardly through the shaft slot and the body slot; and
means for moving the inner shaft in a direction away from the umbilical connector.

12. The umbilical release mechanism of claim 10, wherein the means for moving the inner shaft comprises
a piston on the end of the inner shaft remote from the umbilical connectors; and
a gas generator that applies a gas pressure to the piston so as to move the inner shaft in the direction away from the umbilical connector.

13. The umbilical release mechanism of claim 10, further including
a set of second ball-lock openings in the outer shaft adjacent a shoulder on the retaining mechanism body;
a set of second ball-lock balls resting in the second ball-lock openings, an outer portion of the second ball-lock balls protruding above the outer shaft to contact the shoulder on the retaining mechanism body and an inner portion of the second ball-lock balls riding on the inner shaft;
a depression in the inner shaft disposed such that movement of the inner shaft in the direction away from the umbilical connector causes the second set of ball-lock balls to fall therein, releasing the contact against the shoulder on the retaining mechanism body.

14. The umbilical release mechanism of claim 10, further including
a host-side fluid connector, and
a vehicle-side fluid connector,
the fluid connectors being connected when the electrical connectors are connected, and disconnected when the electical connectors are disconnected.

15. An umbilical release mechanism for disconnecting an umbilical extending between a host and a releasable vehicle, comprising:
an umbilical connector, including
a host-side connector and a vehicle-side connector, and
a pair of backing plates having the two connectors captured therebetween, one of the backing plates on the vehicle and one of the backing plates on the host;
means for applying a clamping pressure between the vehicle-side backing plate and the host-side backing plate and for releasing the clamping pressure responsive to a remote signal while imparting substantially no release-associated force to the vehicle-side electrical harness connector, the means for applying and for releasing remaining entirely with the host after disconnection of the host and the vehicle.

16. The umbilical release mechanism of claim 15, wherein the connectors are electrical connectors.

17. The umbilical release mechanism of claim 15, wherein the connectos are fluid connectors.

* * * * *